US009019075B2

(12) United States Patent
Hayashida

(10) Patent No.: US 9,019,075 B2
(45) Date of Patent: Apr. 28, 2015

(54) USER AUTHENTICATION DEVICE AND USER AUTHENTICATION METHOD

(75) Inventor: Naoko Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1140 days.

(21) Appl. No.: 12/646,369

(22) Filed: Dec. 23, 2009

(65) Prior Publication Data
US 2010/0097179 A1    Apr. 22, 2010

Related U.S. Application Data

(63) Continuation of application No. PCT/JP2007/063671, filed on Jul. 9, 2007.

(51) Int. Cl.
*G05B 19/00* (2006.01)
*G07C 9/00* (2006.01)
*G06F 21/32* (2013.01)

(52) U.S. Cl.
CPC ............ *G07C 9/00158* (2013.01); *G06F 21/32* (2013.01)

(58) Field of Classification Search
CPC ......... G06F 21/32; G06F 21/33; G06F 21/31; G06F 21/316; G07C 9/00158
USPC .......................... 340/5.1, 5.8, 5.81–5.86, 1.1; 382/115–119, 124; 713/186; 235/376, 235/377, 379, 380, 381, 382
See application file for complete search history.

(56) References Cited

U.S. PATENT DOCUMENTS

| | | | |
|---|---|---|---|
| 5,386,104 A * | 1/1995 | Sime | 235/379 |
| 5,389,773 A * | 2/1995 | Coutts et al. | 705/43 |
| 6,418,235 B1 * | 7/2002 | Morimoto et al. | 382/118 |
| 6,993,164 B2 * | 1/2006 | Jang | 382/124 |
| 8,180,118 B2 * | 5/2012 | Neil et al. | 382/124 |
| 8,233,722 B2 * | 7/2012 | Kletter et al. | 382/217 |
| 8,325,993 B2 * | 12/2012 | Dinerstein et al. | 382/115 |
| 8,565,497 B2 * | 10/2013 | Nada et al. | 382/124 |
| 8,680,995 B2 * | 3/2014 | G et al. | 340/541 |

(Continued)

FOREIGN PATENT DOCUMENTS

| | | |
|---|---|---|
| JP | 2000-090264 A | 3/2000 |
| JP | 2001-167305 A | 6/2001 |

(Continued)

OTHER PUBLICATIONS

International Search Report of PCT/JP2007/063671, mailing date of Feb. 12, 2008.

(Continued)

*Primary Examiner* — Brian Zimmerman
*Assistant Examiner* — Ant T Nguyen
(74) *Attorney, Agent, or Firm* — Westerman, Hattori, Daniels & Adrian, LLP

(57) ABSTRACT

Biometric information registered for each user is held, user information being a plurality types of attribute information associated with each user is held, a possibility that the user requests authentication is predicted and a predicted value is calculated for each user by using the plurality types of attribute information contained in the held user information. When biometric information for an authentication request is accepted, the accepted biometric information is matched against the biometric information for a plurality of users determined based on calculated predicted values, and it is determined based on the result of the matching whether a person having entered the accepted biometric information is authenticated as the user.

8 Claims, 13 Drawing Sheets

(56) References Cited

U.S. PATENT DOCUMENTS

| | | | |
|---|---|---|---|
| 8,903,142 B2 * | 12/2014 | Storm et al. | 382/124 |
| 8,905,303 B1 * | 12/2014 | Ben Ayed | 235/380 |
| 2005/0188226 A1 * | 8/2005 | Kasatani | 713/201 |
| 2006/0013448 A1 * | 1/2006 | Itoh et al. | 382/115 |
| 2007/0272744 A1 * | 11/2007 | Bantwal et al. | 235/382 |
| 2010/0097179 A1 * | 4/2010 | Hayashida | 340/5.82 |

FOREIGN PATENT DOCUMENTS

| | | | | |
|---|---|---|---|---|
| JP | 2002-140707 A | 5/2002 | | |
| JP | 2003-044442 A | 2/2003 | | |
| JP | 2004-118592 A | 4/2004 | | |
| JP | 2004118592 A | * 4/2004 | | G06T 7/00 |
| JP | 2005-242521 A | 9/2005 | | |
| JP | 2006-018677 A | 1/2006 | | |

OTHER PUBLICATIONS

Supplementary European Search Report dated Oct. 6, 2011, issued in corresponding European Patent Application No. 07790492.8.

* cited by examiner

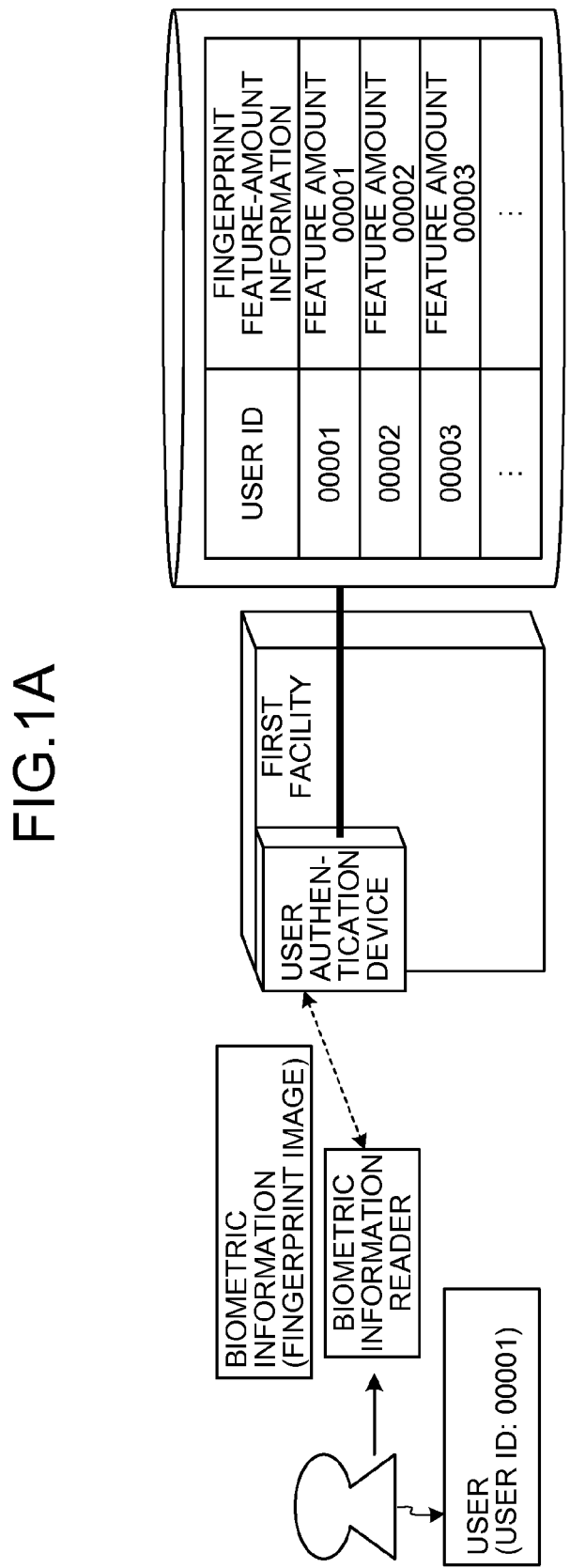

FIG.1B (A)

Tabs: FIRST FACILITY TUESDAY | FIRST FACILITY WEDNESDAY | FIRST FACILITY THURSDAY | FIRST FACILITY FRIDAY | FIRST FACILITY SATURDAY | FIRST FACILITY SUNDAY

USER AUTHENTICATION DEVICE

FIRST FACILITY MONDAY

| FACILITY ID | 01 | | | | | |
|---|---|---|---|---|---|---|
| TIME SLOT | TO 8:00 | TO 8:30 | TO 9:00 | TO 9:30 | TO 10:00 | OTHER |
| TOTAL ROOM-ENTRY HISTORY | 20% | 40% | 10% | 10% | 10% | 10% |
| USER ID | 00001 | | | | | |
| TIME SLOT | TO 8:00 | TO 8:30 | TO 9:00 | TO 9:30 | TO 10:00 | OTHER |
| FIXED INFORMATION | 1 | 1 | 0 | 0 | 0 | 0 |
| INDIVIDUAL ROOM-ENTRY HISTORY | 90% | 5% | 0% | 0% | 0% | 5% |
| POSITION: NONE | 0 | 0 | 0 | 0 | 0 | 0 |
| USER ID | 00002 | | | | | |
| TIME SLOT | TO 8:00 | TO 8:30 | TO 9:00 | TO 9:30 | TO 10:00 | OTHER |
| FIXED INFORMATION | 1 | 1 | 0 | 0 | 0 | 0 |
| INDIVIDUAL ROOM-ENTRY HISTORY | 30% | 60% | 10% | 0% | 0% | 0% |
| POSITION: BOARD MEMBER | 1 | 1 | 1 | 1 | 1 | 1 |
| USER ID | 00003 | | | | | |
| TIME SLOT | TO 8:00 | TO 8:30 | TO 9:00 | TO 9:30 | TO 10:00 | OTHER |
| FIXED INFORMATION | 0 | 0 | 0 | 0 | 0 | 0 |
| INDIVIDUAL ROOM-ENTRY HISTORY | 0% | 5% | 45% | 45% | 0% | 5% |
| POSITION: NONE | 0 | 0 | 0 | 0 | 0 | 0 |

⋮

(B)
ATTRIBUTE INFORMATION SETTING
FIRST FACILITY
MONDAY

| USER ID | TIME SLOT | | | | | |
|---|---|---|---|---|---|---|
| | TO 8:00 | TO 8:30 | TO 9:00 | TO 9:30 | TO 10:00 | OTHER |
| 00001 | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY |
| 00002 | POSITION×100 | POSITION×100 | POSITION×100 | POSITION×100 | POSITION×100 | POSITION×100 |
| 00003 | TOTAL-ROOM-ENTRY HISTORY | TOTAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY |
| ⋮ | ⋮ | ⋮ | ⋮ | ⋮ | ⋮ | ⋮ |

(C)
PREDICTED VALUE
FIRST FACILITY
MONDAY

| USER ID | TIME SLOT | | | | | |
|---|---|---|---|---|---|---|
| | TO 8:00 | TO 8:30 | TO 9:00 | TO 9:30 | TO 10:00 | OTHER |
| 00001 | 90 | 5 | 0 | 0 | 0 | 5 |
| 00002 | 100 | 100 | 100 | 100 | 100 | 100 |
| 00003 | 20 | 40 | 45 | 45 | 0 | 5 |
| ⋮ | ⋮ | ⋮ | ⋮ | ⋮ | ⋮ | ⋮ |

FIG.3

| USER ID | FINGERPRINT FEATURE-AMOUNT INFORMATION |
|---|---|
| 00001 | FEATURE AMOUNT 00001 |
| 00002 | FEATURE AMOUNT 00002 |
| 00003 | FEATURE AMOUNT 00003 |
| ⋮ | ⋮ |
| ⋮ | ⋮ |
| ⋮ | ⋮ |

FIG.4

FIRST FACILITY
MONDAY

| FACILITY ID | 01 | | | | | |
|---|---|---|---|---|---|---|
| TIME SLOT | TO 8:00 | TO 8:30 | TO 9:00 | TO 9:30 | TO 10:00 | OTHER |
| TOTAL ROOM-ENTRY HISTORY | 20% | 40% | 10% | 10% | 10% | 10% |

| USER ID | 00001 | | | | | |
|---|---|---|---|---|---|---|
| TIME SLOT | TO 8:00 | TO 8:30 | TO 9:00 | TO 9:30 | TO 10:00 | OTHER |
| FIXED INFORMATION | 1 | 1 | 0 | 0 | 0 | 0 |
| INDIVIDUAL ROOM-ENTRY HISTORY | 90% | 5% | 0% | 0% | 0% | 5% |
| POSITION: NONE | 0 | 0 | 0 | 0 | 0 | 0 |

| USER ID | 00002 | | | | | |
|---|---|---|---|---|---|---|
| TIME SLOT | TO 8:00 | TO 8:30 | TO 9:00 | TO 9:30 | TO 10:00 | OTHER |
| FIXED INFORMATION | 1 | 1 | 0 | 0 | 0 | 0 |
| INDIVIDUAL ROOM-ENTRY HISTORY | 30% | 60% | 10% | 0% | 0% | 0% |
| POSITION: BOARD MEMBER | 1 | 1 | 1 | 1 | 1 | 1 |

| USER ID | 00003 | | | | | |
|---|---|---|---|---|---|---|
| TIME SLOT | TO 8:00 | TO 8:30 | TO 9:00 | TO 9:30 | TO 10:00 | OTHER |
| FIXED INFORMATION | 0 | 0 | 0 | 0 | 0 | 0 |
| INDIVIDUAL ROOM-ENTRY HISTORY | 0% | 5% | 45% | 45% | 0% | 5% |
| POSITION: NONE | 0 | 0 | 0 | 0 | 0 | 0 |

FIRST FACILITY MONDAY

| USER ID | TIME SLOT | | | | | |
|---------|-----------|---|---|---|---|---|
| | TO 8:00 | TO 8:30 | TO 9:00 | TO 9:30 | TO 10:00 | OTHER |
| 00001 | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY |
| 00002 | POSITION×100 | POSITION×100 | POSITION×100 | POSITION×100 | POSITION×100 | POSITION×100 |
| 00003 | TOTAL ROOM-ENTRY HISTORY | TOTAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY | INDIVIDUAL ROOM-ENTRY HISTORY |
| ... | ... | ... | ... | ... | ... | ... |

FIG.6

FIRST FACILITY
MONDAY

| USER ID | TIME SLOT | | | | | |
|---|---|---|---|---|---|---|
| | TO 8:00 | TO 8:30 | TO 9:00 | TO 9:30 | TO 10:00 | OTHER |
| 00001 | 90 | 5 | 0 | 0 | 0 | 5 |
| 00002 | 100 | 100 | 100 | 100 | 100 | 100 |
| 00003 | 20 | 40 | 45 | 45 | 0 | 5 |
| ... | ... | ... | ... | ... | ... | ... |

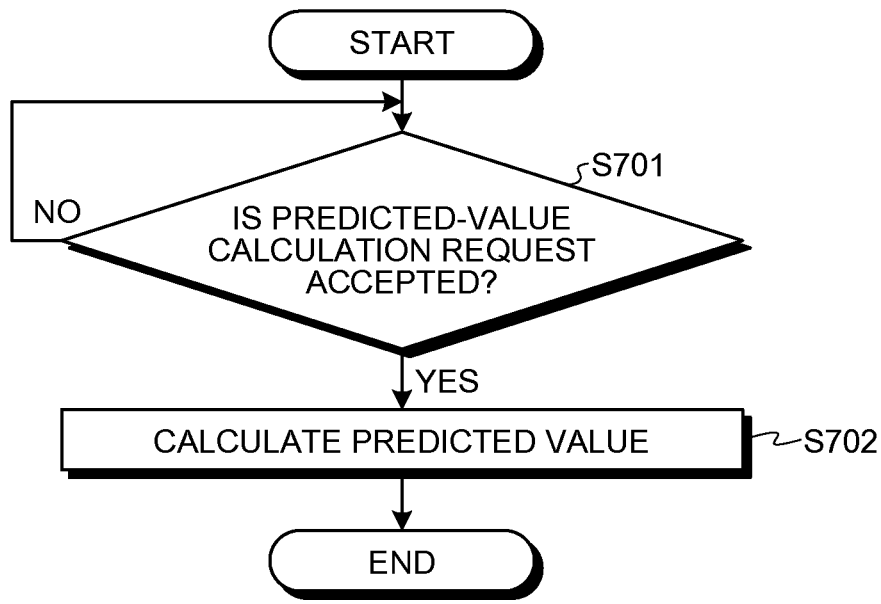
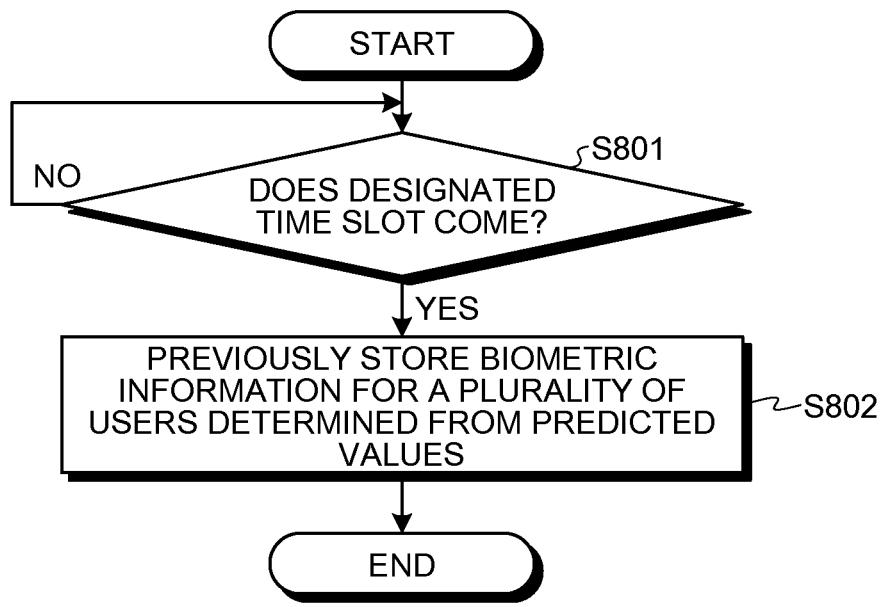

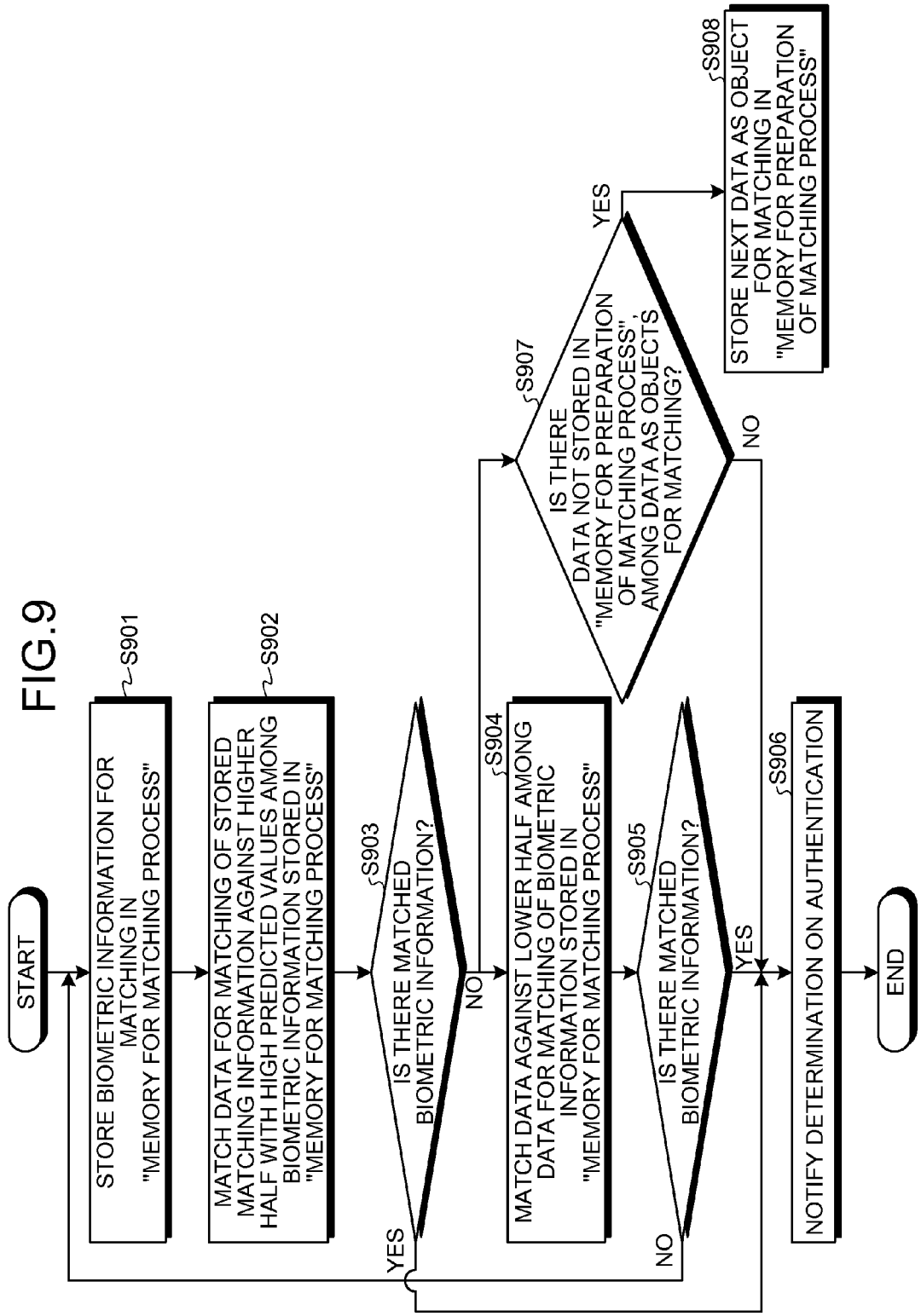

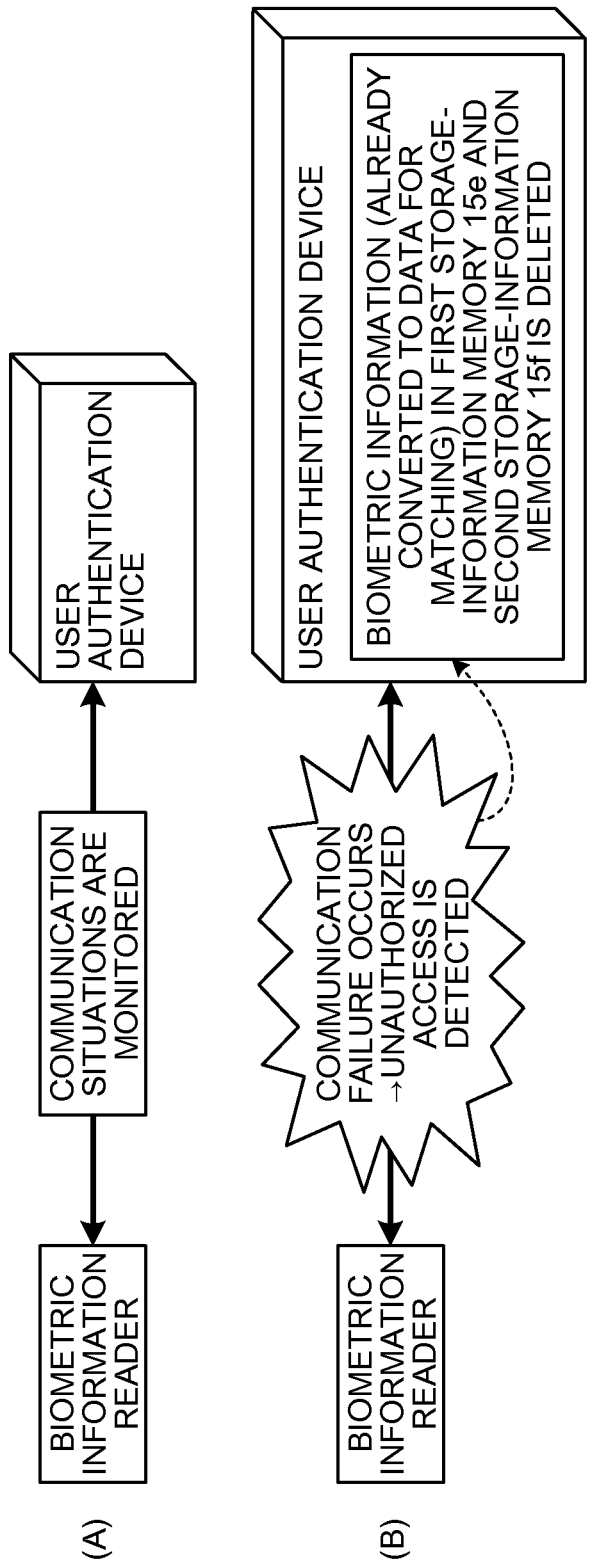

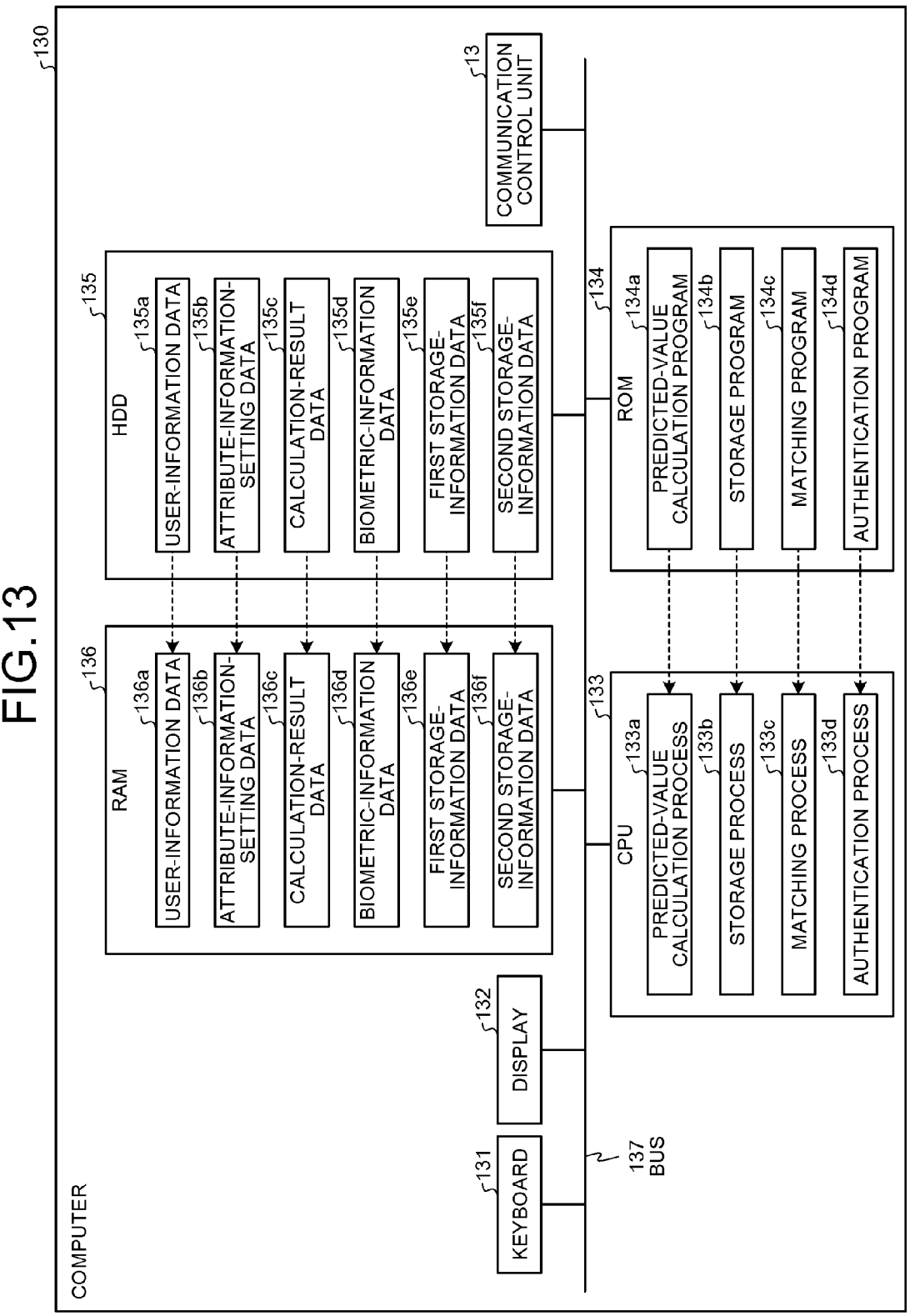

USER AUTHENTICATION DEVICE AND USER AUTHENTICATION METHOD

CROSS-REFERENCE TO RELATED APPLICATION(S)

This application is a continuation of International Application No. PCT/JP2007/063671, filed on Jul. 9, 2007, the entire contents of which are incorporated herein by reference.

FIELD

The present invention relates to a user authentication device, a user authentication method, and a user authentication program.

BACKGROUND

Conventionally, there is widely used biometric authentication for authenticating an individual by using biometric information (for example, fingerprint, palm vein pattern, and iris of the eye) that is information specific to the individual and is hard to be forged.

For example, in entry control into a facility by using biometric authentication, only if biometric information accepted from a person desiring to enter the facility matches biometric information previously registered as a user, the person desiring to enter the facility is authenticated as the user who is permitted to enter the facility, and so the person is permitted to enter the facility.

Here, a method for biometric authentication is roughly classified into two types: "1:1 authentication" and "1:N authentication". The "1:1 authentication" is implemented by accepting identification information such as ID together with biometric information from a person requesting authentication (for example, a person desiring to enter the facility), identifying the biometric information corresponding to the identification information from previously registered biometric information, and matching the identified biometric information against the accepted biometric information, to authenticate whether the person is an authenticated user. The "1:N authentication" is implemented by accepting only biometric information from a person requesting authentication, and matching the accepted biometric information against a plurality of previously registered biometric information (all or some of information as objects for matching), to authenticate whether the person is an authenticated user.

As seen above, because the "1:N authentication" does not require identification information such as ID (for example, the user is not required to carry an ID card or the like capable of storing therein and transmitting the identification information), this method is gaining attention as a method excellent in convenience as compared with the "1:1 authentication".

However, the "1:N authentication" has a problem that the time required for a matching process with the accepted biometric information is increased with an increase in the number (N) of biometric information as objects for matching.

Japanese Laid-open Patent Publication No. 2002-140707, therefore, discloses a priority processing unit that focuses on information in which a certain tendency appears in a behavior pattern of each individual such as a start of office hours of each employee, adds, for example, each priority according to time slots to registered biometric information, and matches biometric information accepted in a certain time slot against those in order from biometric information with a high priority that is added thereto according to the time slot, among the registered biometric information, to reduce the time required for the matching process.

Japanese Laid-open Patent Publication No. 2003-44442 discloses a data authentication method for reducing a time required for a matching process in such a manner that when a server holding therein biometric information for all registered users accepts the biometric information for a user through a terminal owned by the user, and matches the accepted biometric information against the biometric information for all the registered users, to authenticate an access from the terminal, the server downloads the biometric information for the user held thereby into a cache memory of the terminal, and performs subsequent authentication by using the biometric information downloaded into the cache memory of the terminal.

Japanese Laid-open Patent Publication No. 2001-167305 discloses a gate management system for reducing a time required for a matching process by storing information for a person on a blacklist and information for a person who frequently passes a gate, from a server to a cache memory of the gate.

A technology for matching in order from the biometric information with a high priority has a problem that efficient authentication cannot be always achieved because only one behavior pattern is focused on and a priority is added thereto.

More specifically, the behavior pattern of each individual is not limited by only one element, but changes according to a plurality of elements such as a change of a time slot, a day of the week, and working hours. Therefore, there is a problem that even if only the one behavior pattern is focused on and the priority is added thereto, the efficient authentication cannot be always achieved.

The technologies using the cache memory have a problem that because the biometric information is cached based on previously determined information, the technologies cannot support the behavior pattern of each individual that changes according to the plurality of elements, and thus the efficient authentication cannot be always achieved.

SUMMARY

According to an aspect of an embodiment of the invention, a user authentication device for authenticating a user by using biometric information, includes a registered-biometric-information holding unit that holds the biometric information registered for each user; a user-information holding unit that holds user information being a plurality types of attribute information in association with the each user; a predicted-value calculating unit that predicts a possibility that the user requests authentication and calculates a predicted value for the each user by using the plurality types of attribute information contained in the user information held by the user-information holding unit; a matching unit that matches, when accepting biometric information for an authentication request, accepted biometric information against the biometric information held by the registered-biometric-information holding unit about a plurality of users determined based on predicted values calculated by the predicted-value calculating unit; and an authentication determining unit that determines whether a person having entered the accepted biometric information is authenticated as the user based on a result of the matching performed by the matching unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1A is a diagram for explaining an overview and characteristics of a user authentication device according to a first embodiment;

FIG. 1B is a diagram for explaining the overview and characteristics of the user authentication device according to the first embodiment;

FIG. 3 is a diagram for explaining a biometric-information memory according to the first embodiment;

FIG. 4 is a diagram for explaining a user-information memory according to the first embodiment;

FIG. 5 is a diagram for explaining an attribute-information-setting memory according to the first embodiment;

FIG. 6 is a diagram for explaining a calculation-result memory according to the first embodiment;

FIG. 7 is a diagram for explaining a predicted-value calculation process in the user authentication device according to the first embodiment;

FIG. 8 is a diagram for explaining a biometric-information storage process in the user authentication device according to the first embodiment;

FIG. 9 is a diagram for explaining a process from acceptance of biometric information to authentication in the user authentication device according to the first embodiment;

FIG. 10 is diagrams for explaining an overview and characteristics of a user authentication device according to a second embodiment;

FIG. 13 is a diagram representing a computer executing a user authentication program according to the first embodiment.

DESCRIPTION OF EMBODIMENTS

Preferred embodiments of the present invention will be explained with reference to accompanying drawings.

It should be noted that the following explains a case, as an embodiment, in which the user authentication device according to the present invention is applied to entry control into a facility. Furthermore, the following sequentially explains the overview and characteristics of the user authentication device according to the first embodiment, the configuration and procedure of processes of the user authentication device according to the first embodiment, and the effect of the first embodiment, then explains the user authentication device according to the second embodiment similarly to the first embodiment, and lastly explains other embodiments.

[a] First Embodiment

Figure 1C:
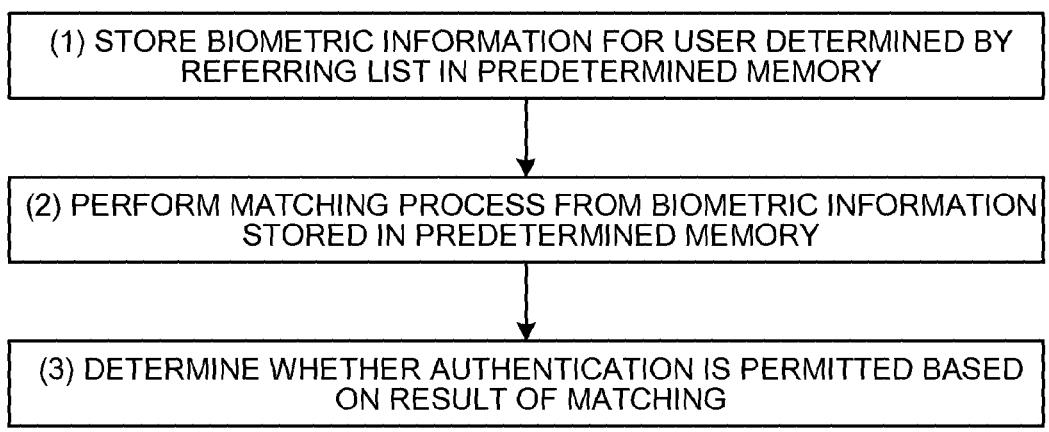
FIG. 1C is a diagram for explaining the overview and characteristics of the user authentication device according to the first embodiment.

Overview and Characteristics of User Authentication Device According to First Embodiment First, the main characteristics of the user authentication device according to the first embodiment are specifically explained with reference to FIG. 1A, FIG. 1B, and FIG. 1C. FIG. 1A, FIG. 1B, and FIG. 1C are diagrams for explaining the overview and characteristics of the user authentication device according to the first embodiment.

The overview of the user authentication device according to the first embodiment is to authenticate a user by using biometric information.

More specifically, as represented in FIG. 1A, for example, a user (user ID: 00001), being an employee desiring to enter a "first facility" which is one of a plurality of facilities located in the premises of a company, causes a biometric information reader to read user's fingerprint, while when the biometric information reader transmits a "fingerprint image" as the biometric information for the user to the user authentication device, then the user authentication device performs "1:N authentication", and authenticates, only if accepted biometric information matches the biometric information previously registered as the user, the person having entered the accepted biometric information as the user who is permitted to enter the "first facility".

Here, the main characteristics of the present invention are to allow achievement of the efficient authentication. The main characteristics are briefly explained. The user authentication device according to the first embodiment holds therein biometric information registered for each user. More specifically, for all the registered users (for example, all the 50000 employees), "user ID" allocated to each user and "fingerprint feature-amount information" extracted from the "fingerprint image" being the biometric information for the user are held in a main memory or the like in association with each other.

For example, as represented in FIG. 1A, "user ID: 00001" and "fingerprint feature-amount information: feature amount 00001" are associated with each other and are held therein. It should be noted that the "fingerprint feature-amount information" represents information such that a characteristic portion, such as a break of a curve or a separate point of curves forming the fingerprint, is extracted as a feature amount from the "fingerprint image".

The user authentication device according to the first embodiment holds therein user information being a plurality types of attribute information associated with each user. For example, as represented in (A) of FIG. 1B, the user authentication device holds therein "fixed information", "total room-entry history", "individual room-entry history", and "position" which are the plurality types of attribute information in association with each user, as "user information" on each "day of the week" in a facility ("first facility" in the present embodiment) where the user authentication device is installed. Explanation is made below for the user information, mainly for the attribute information of the user allocated with "user ID: 00001" for "Monday" in the "first facility".

The "fixed information" is attribute information estimated from working hours of the user. For example, if "8:30" is set as a working start time of the working hours in the company, then "1" associated with the time slots of "to 8:00" and "to 8:30" is given to the user whose working place is assigned to the "first facility". More specifically, as represented in (A) of FIG. 1B, as "fixed information" for the user (user ID: 00001) and for a user (user ID: 00002) whose working place is assigned to the "first facility", "1" is given to the "time slots" of "to 8:00" and "to 8:30", and "0" is given to the "time slots" of "to 9:00", "to 9:30", "to 10:00", and "other (any other)". As "fixed information" for a user (user ID: 00003) whose working place is assigned to some other facility, "0" is given to all the "time slots" (see (A) of FIG. 1B). It should be noted that "to 8:00" indicates a time slot of "6:00 to 8:00", "to 8:30" indicates a time slot of "8:01 to 8:30", "to 9:00" indicates a time slot of "8:31 to 9:00", "to 9:30" indicates a time slot of "9:01 to 9:30", "to 10:00" indicates a time slot of "9:31 to 10:00", and "other" indicates any time slot other than these.

The "total room-entry history" is attribute information given as a probability of room entry in each "time slot" statistically calculated from a control history of entries of all the users (for example, all the 50000 employees) into the "first facility", and the same value is given to all the users. For example, as represented in (A) of FIG. 1B, in association with "facility ID: 01" of the "first facility", for all the users, "20%" is given to "time slot: to 8:00", "40%" is given to "time slot: to 8:30", "10%" is given to "time slot: to 9:00", "10%" is given to "time slot: to 9:30", "10%" is given to "time slot: to 10:00", and "10%" is given to "time slot: other".

The "individual room-entry history" is a probability in each "time slot" statistically calculated from the control history of entries of each user (for example, each of all the 50000 employees) into the "first facility". For example, as represented in (A) of FIG. 1B, as the "individual room-entry history" of the user (user ID: 00001), "90%" is given to "time slot: to 8:00", "5%" is given to "time slot: to 8:30", "0%" is given to "time slot: to 9:00", "0%" is given to "time slot: to 9:30", "0%" is given to "time slot: to 10:00", and "5%" is given to "time slot: other".

The "position" is a numerical value given based on a position of each user. For example, as represented in (A) of FIG. 1B, "numerical value: 0" is given to the user (user ID: 00001) and the user (user ID: 00003) with "position: none", and "numerical value: 1" is given to the user (user ID: 00002) with "position: board member".

The user authentication device according to the first embodiment also holds therein, as represented in (A) of FIG. 1B, the "fixed information", the "total room-entry history", the "individual room-entry history", and the "position" which are the plurality types of attribute information associated with each user for "Tuesday" to "Sunday" other than for "Monday", respectively, as "user information" in the "first facility".

The user authentication device according to the first embodiment sets attribute information used for calculating a predicted value, explained later, from the held plurality types of attribute information. For example, as represented in (B) of FIG. 1B, as "attribute information setting" for "Monday" in the "first facility", the adoption of the "individual room-entry history" for each "time slot" indicated by the probability is set as a predicted value in the user with "user ID: 00001", and the adoption of a value (100) as "100 times" of "numerical value: 1" which is given to the "position: board member" for all the time slots is set in the user with "user ID: 00002".

Set in the user with "user ID: 00003" is, as represented in (B) of FIG. 1B, the adoption of the "total room-entry history" as the probability for the "time slot: to 8:00" and the "time slot: to 8:30" as the "attribute information setting" for "Monday" in the "first facility", and the adoption of the "individual room-entry history" as the probability for "time slot: to 9:00", "time slot: to 9:30", "time slot: to 10:00", and "time slot: other" is set therein.

The user authentication device according to the first embodiment refers to the "attribute information setting" and calculates a predicted value, for each user, as a use probability that each user requests authentication to use the "first facility", from the plurality types of attribute information contained in the held user information. That is, the user authentication device according to the first embodiment refers to the "attribute information setting" for "Monday" in the "first facility" as represented in (B) of FIG. 1B and calculates a predicted value as a use probability for each user from the "user information" for "Monday" in the "first facility" as represented in (A) of FIG. 1B (see (C) of FIG. 1B). For example, for the user with "user ID: 00003", as predicted values for "Monday" in the "first facility", "20%" is calculated for "time slot: to 8:00", "40%" for "time slot: to 8:30", "45%" for "time slot: to 9:00", "45%" for "time slot: to 9:30", "0%" for "time slot: to 10:00", and "5%" for "time slot: other".

The user authentication device according to the first embodiment previously stores the biometric information for a plurality of users determined based on the calculated predicted values in a predetermined memory (for example, a first storage-information memory 15e and a second storage-information memory 15f, explained later). That is, the user authentication device according to the first embodiment previously stores the biometric information for users determined by referring to a list of the predicted values for each user for "Monday" in the "first facility" as represented in (C) of FIG. 1B, in the predetermined memory (see (1) of FIG. 1C). More specifically, the user authentication device refers to the list of the predicted values for each user in each of "time slots" on "Monday", and previously stores, for example, "fingerprint feature-amount information" for top 100 persons with high predicted values, from a database represented in FIG. 1A to the predetermined memory. The "fingerprint feature-amount information" is previously stored in the predetermined memory at each start time in the respective time slots of, for example, "to 8:00", "to 8:30", "to 9:00", "to 9:30", "to 10:00", and "other" on Monday.

When accepting biometric information for an authentication request, the user authentication device according to the first embodiment matches the accepted biometric information against the biometric information stored in the predetermined memory.

For example, the user (user ID: 00001), being the employee desiring to enter the "first facility", causes the biometric information reader to read user's fingerprint at 8:15 a.m. on Monday, and when the biometric information reader transmits the "fingerprint image" as the biometric information for the user, then the user authentication device according to the first embodiment converts the accepted biometric information to data for matching (fingerprint feature-amount information), and performs the matching process from the "fingerprint feature-amount information" for top 100 persons with high predicted values stored in the predetermined memory in the time slot (to 8:30) on Monday (see (2) of FIG. 1C). If there is no biometric information stored in the predetermined memory that matches the accepted biometric information, the accepted biometric information is further matched against the biometric information for low-order users in the list.

The user authentication device according to the first embodiment determines whether the person having entered the accepted biometric information is authenticated as the user based on the result of matching (see (3) of FIG. 1C). More specifically, when there is biometric information that matches the accepted biometric information, the user authentication device according to the first embodiment determines the user (user ID: 00001) having entered the accepted biometric information into the biometric information reader as the user. Meanwhile, if there is no biometric information that matches the accepted biometric information even if it is matched against all the registered objects for matching, then it is determined that the user is not authenticated as the user.

The present embodiment has explained the case in which the "fingerprint" is used as biometric information, however, the present invention is not limited thereto. Thus, there may be a case in which any other biometric information such as "palm vein pattern", "iris of the eye", "finger vein pattern", and "face image data" is used.

Moreover, the present embodiment has explained the case in which the "attribute information setting" is set in each "time slot" on respective "days of the week" to create the list of predicted values, and the matching and authentication are performed by referring to the list. However, the present invention is not limited thereto. Thus, there may be a case in which, for example, the "attribute information setting" is set "weekly" in each "time slot" or the "attribute information setting" is set "monthly" in each "time slot", to create the list of the predicted values, and the matching and authentication are performed by referring to the list. There may be another case in which any "attribute information setting", other than the attribute information explained in the present embodiment, is set by using personal background information for the user such as "behavior history", "preference information", and "appointment situation", to create the list of predicted values.

Furthermore, the present embodiment has explained the case in which a single user authentication device controls entries into one facility, however, the present invention is not limited thereto. Thus, there may be a case in which, for example, the single user authentication device controls entries into a plurality of facilities. That is, there may be a case in which the user authentication device holds therein the user information for each of the plurality of facilities and controls entries into each of the facilities by using predicted values for each user calculated for each facility.

Moreover, the present embodiment has explained the case in which the biometric information determined based on the predicted value calculated through the attribute information setting is previously stored and the matching and authentication processes are performed, however, the present invention is not limited thereto. Thus, there may be a case in which a use efficiency indicating how the biometric information for a plurality of users determined based on the calculated predicted values is used is calculated, and the attribute information used for calculating the predicted value for each user is reset when the calculated use efficiency is below a predetermined value.

For example, a probability, as a use efficiency, that the accepted biometric information matches the biometric information previously stored in the predetermined memory is calculated for each predetermined interval (for example, weekly), and when the use efficiency is less than a predetermined value (for example, 50%), the attribute information setting may be reviewed.

Furthermore, the present embodiment has explained the case in which all the registered biometric information is set as objects for matching, however, the present invention is not limited thereto. Thus, there may be a case in which, for example, a list of persons on a blacklist is previously held and the biometric information for the user on the list is excluded from the objects for matching.

Moreover, the present embodiment has explained the case in which the biometric information reader transmits the biometric information (fingerprint image), however, the present invention is not limited thereto. Thus, there may be a case in which, for example, the biometric information reader transmits "identification information" allocated to the relevant biometric information reader together with the biometric information. This enables, for example, the user authentication device to determine whether the biometric information is the one transmitted by the biometric information reader which can be communicated with the device itself, to receive only the biometric information from the authorized (the registered identification number is allocated) biometric information reader, and to perform matching and authentication processes, which allows achievement of higher-security authentication.

Furthermore, the present embodiment has explained the case in which the entry control into the facilities is an object to which the present invention is applied, however, the object to which the present invention is applied is not limited thereto. Thus, there may be a case in which the present invention is applied to login authentication of an information terminal such as a computer.

Figure 1D:
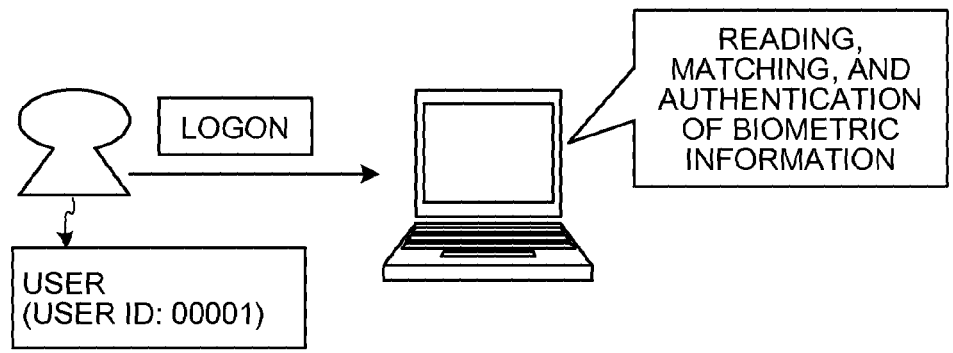
FIG. 1D is a schematic for explaining another configuration of the user authentication device according to the first embodiment.

That is, the present embodiment has explained the case in which a terminal that reads the biometric information and transmits/receives the read biometric information is provided differently from a space where the user goes in and out. However, there may be a case in which, as represented in FIG. 1D, a terminal that transmits the biometric information received from the user upon authentication is the same as a target terminal which whether or not the use is permitted is notified. Any assumption other than this is similar to the present embodiment. FIG. 1D is a schematic for explaining another configuration of the user authentication device according to the first embodiment.

These enable the user authentication device according to the first embodiment to add a priority, based on the predicted values of each user calculated from the plurality types of attribute information, to the registered biometric information, which allows achievement of the efficient authentication as explained in the main characteristics.

Configuration of User Authentication Device According to First Embodiment

Figure 2:
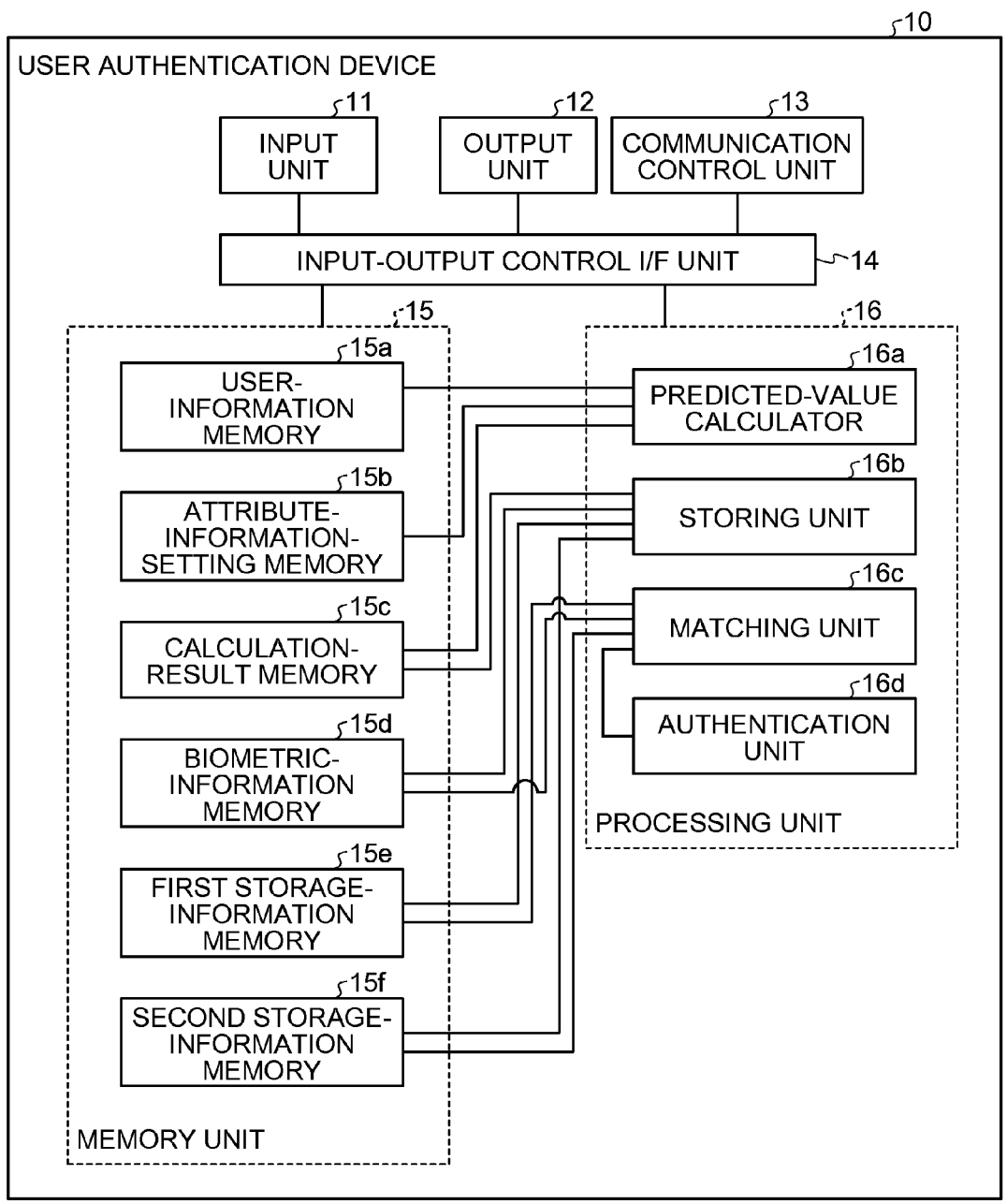
FIG. 2 is a block diagram representing a configuration of the user authentication device according to the first embodiment.

Next, the user authentication device according to the first embodiment is explained with reference to FIGS. 2 to 6. FIG. 2 is a block diagram representing a configuration of the user authentication device according to the first embodiment, FIG. 3 is a diagram for explaining a biometric-information memory according to the first embodiment, FIG. 4 is a diagram for explaining a user-information memory according to the first embodiment, FIG. 5 is a diagram for explaining an attribute-information-setting memory according to the first embodiment, and FIG. 6 is a diagram for explaining a calculation-result memory according to the first embodiment.

As represented in FIG. 2, a user authentication device 10 according to the first embodiment includes an input unit 11, an output unit 12, a communication control unit 13, an input-output control I/F unit 14, a memory unit 15, and a processing unit 16.

The input unit 11 that inputs various types of information is provided with a keyboard and a mouse or the like, and accepts and inputs the "user information" and "attribute information setting" or the like, as a portion particularly closely related to the present invention, through, for example, the keyboard.

The output unit 12 that outputs various types of information is provided with a monitor and a speaker or the like, and outputs a warning tone from the speaker when an authentication determination result performed by an authentication unit 16d explained later is "not authenticated", as a portion particularly closely related to the present invention.

The communication control unit 13 controls communications with other devices, and controls exchange of information such as "fingerprint image" and "authentication determination result" with the biometric information reader, as a portion particularly closely related to the present invention, through wireless communication such as radio wave communication.

The input-output control I/F unit 14 controls data transfer between each of the input unit 11, the output unit 12, and the communication control unit 13, and each of the memory unit 15 and the processing unit 16.

The memory unit 15 stores therein data used for various processes performed by the processing unit 16 and results of the various processes performed by the processing unit 16, and includes, as those particularly closely related to the present invention as represented in FIG. 2, a user-information memory 15a, an attribute-information-setting memory 15b, a calculation-result memory 15c, a biometric-information memory 15d, the first storage-information memory 15e, and the second storage-information memory 15f. Here, the user-information memory 15a corresponds to "user-information holding unit" according to what is claimed, the attribute-information-setting memory 15b also corresponds to "setting unit", and the biometric-information memory 15d also corresponds to "registered-biometric-information holding unit". Further, the first storage-information memory 15e and the second storage-information memory 15f correspond to "predetermined memory" according to what is claimed.

The biometric-information memory 15d holds therein biometric information registered for each user. More specifically, the biometric-information memory 15d holds therein the "user ID" allocated to each user of all the registered users (for example, all the 50000 employees) in association with "fingerprint feature-amount information" extracted from a "fingerprint image" being the biometric information for the user. For example, as represented in FIG. 3, the "user ID: 00001" is held in association with "fingerprint feature-amount information: feature amount 00001".

The user-information memory 15a stores therein user information being a plurality types of attribute information associated with each user. For example, as represented in FIG. 4, the user-information memory 15a stores therein the "fixed information", the "total room-entry history", the "individual room-entry history", and the "position" which are the plurality types of attribute information, in association with each user, as "user information" on each "day of the week" in the "first facility" where the user authentication device is installed.

The "fixed information" is the attribute information estimated from the working hours of the user.

For example, if "8:30" is set as a working start time of the working hours in the company, then "1" associated with the time slots of "to 8:00" and "to 8:30" is given to the user whose working place is assigned to the "first facility". More specifically, as represented in FIG. 4, as the "fixed information" for the user (user ID: 00001) and the user (user ID: 00002) on Monday, "1" is given to the "time slots" of "to 8:00" and "to 8:30", and "0" is given to the "time slots" of "to 9:00", "to 9:30", "to 10:00", and "other". Moreover, as represented in FIG. 4, as the "fixed information" for the user (user ID: 00003) whose working place is assigned to some other facility, "0" is given to all the "time slots".

The "total room-entry history" is the attribute information given as a probability of room entry in each "time slot" statistically calculated from a control history of entries of all the users (for example, all the 50000 employees) into the "first facility", and the same value is given to all the users. For example, as represented in FIG. 4, as the "total room-entry history" on Monday, for all the users in association with "facility ID: 01" of the "first facility", "20%" is given to "time slot: to 8:00", "40%" is given to "time slot: to 8:30", "10%" is given to "time slot: to 9:00", "10%" is given to "time slot: to 9:30", "10%" is given to "time slot: to 10:00", and "10%" is given to "time slot: other".

The "individual room-entry history" is a probability in each "time slot" statistically calculated from the control history of entries of each user (for example, each of all the 50000 employees) into the "first facility". For example, as represented in FIG. 4, as the "individual room-entry history" of the user (user ID: 00001) on Monday, "90%" is given to "time slot: to 8:00", "5%" is given to "time slot: to 8:30", "0%" is given to "time slot: to 9:00", "0%" is given to "time slot: to 9:30", "0%" is given to "time slot: to 10:00", and "5%" is given to "time slot: other".

The "position" is a numerical value given based on a position of each user. For example, as represented in FIG. 4, "numerical value: 0" is given to the user (user ID: 00001) and the user (user ID: 00003) with "position: none", and "numerical value: 1" is given to the user (user ID: 00002) with "position: board member".

In this manner, the user-information memory 15a stores therein the "fixed information", the "total room-entry history", the "individual room-entry history", and the "position" which are the plurality types of attribute information associated with each user, as "user information" for "Monday" in the "first facility". The user-information memory 15a also stores therein the "fixed information", the "total room-entry history", the "individual room-entry history", and the "position" which are associated with each user, as "user information" in the "first facility" for "Tuesday" to "Sunday" other than for "Monday", respectively.

The attribute-information-setting memory 15b stores therein the setting of attribute information as "attribute information setting" used when a predicted-value calculator 16a explained later calculates a predicted value, from the plurality types of attribute information stored in the user-information memory 15a. For example, as represented in FIG. 5, as "attribute information setting" for "Monday" in the "first facility", the attribute-information-setting memory 15b stores therein the adoption of the "individual room-entry history" for each "time slot" indicated by the probability as a predicted value for the user with "user ID: 00001", and stores therein the adoption of a value (100) as "100 times" of "numerical value: 1" given to the "position: board member" for all the time slots for the user with "user ID: 00002".

For the user with "user ID: 00003", as the "attribute information setting" for "Monday" in the "first facility" as represented in FIG. 5, the attribute-information-setting memory 15b stores therein the adoption of the "total room-entry history" as the probability for the "time slot: to 8:00" and the "time slot: to 8:30", and the adoption of the "individual room-entry history" as the probability for "time slot: to 9:00", "time slot: to 9:30", "time slot: to 10:00", and "time slot: other".

The calculation-result memory 15c stores therein a result of calculation by the predicted-value calculator 16a explained later, and the first storage-information memory 15e and the second storage-information memory 15f store therein biometric information specified by a storing unit 16b explained later, of the biometric information stored in the biometric-information memory 15d. These will be explained in detail later.

The processing unit 16 executes various processes based on the data transferred from the input-output control I/F unit 14, and includes, as those particularly closely related to the present invention as represented in FIG. 2, the predicted-value calculator 16a, the storing unit 16b, a matching unit 16c, and the authentication unit 16d. Here, the predicted-value calculator 16a corresponds to "predicted-value calculating unit" according to what is claimed, the storing unit 16b also corresponds to "storing unit", the matching unit 16c also corresponds to "matching unit", and the authentication unit 16d also corresponds to "authentication determining unit".

The predicted-value calculator 16a refers to the "attribute information setting" stored in the attribute-information-setting memory 15b, calculates a predicted value, for each user, as a use probability that the user requests authentication to use the "first facility", from the plurality types of attribute information contained in the user information stored in the user-information memory 15a, and stores the result thereof in the calculation-result memory 15c.

More specifically, the predicted-value calculator 16a refers to the "attribute information setting" for "Monday" in the "first facility" stored in the attribute-information-setting memory 15b as represented in FIG. 5, calculates a predicted value as a use probability for each user from the "user information" for "Monday" in the "first facility" stored in the user-information memory 15a as represented in FIG. 4, and stores the result thereof in the calculation-result memory 15c (see FIG. 6). For example, as represented in FIG. 6, for the user with "user ID: 00003", as predicted values for "Monday" in the "first facility", the results of the calculation: "20%" for "time slot: to 8:00", "40%" for "time slot: to 8:30", "45%" for "time slot: to 9:00", "45%" for "time slot: to 9:30", "0%" for "time slot: to 10:00", and "5%" for "time slot: other" are stored therein.

The storing unit 16b previously stores the biometric information for a plurality of users determined based on the calculated predicted values in the first storage-information memory 15e or in the second storage-information memory 15f. That is, the storing unit 16b previously stores the biometric information, of the biometric information stored in the biometric-information memory 15d, for a user determined by referring to the calculation result stored in the calculation-result memory 15c represented in FIG. 6, in the first storage-information memory 15e or in the second storage-information memory 15f. More specifically, the storing unit 16b refers to the list of the users rearranged in order from the one with a high predicted value in each of the "time slots" on "Monday", and previously stores first "fingerprint feature-amount information" for, for example, top 100 persons with high predicted values among the "fingerprint feature-amount information" being the biometric information stored in the biometric-information memory 15d represented in FIG. 3, in the first storage-information memory 15e. That is, the storing unit 16b previously stores the "fingerprint feature-amount information" in the first storage-information memory 15e in each time slot of "to 8:00", "to 8:30", "to 9:00", "to 9:30", "to 10:00", and "other" on Monday. The second storage-information memory 15f will be explained in detail later in explanation of the following matching unit 16c.

When accepting biometric information for an authentication request, the matching unit 16c first matches the accepted biometric information against the biometric information stored in the first storage-information memory 15e.

For example, the user (user ID: 00001), being the employee desiring to enter the "first facility", causes the biometric information reader to read user's fingerprint at 8:15 a.m. on Monday, and when the biometric information reader transmits the "fingerprint image" as the biometric information for the user, then the matching unit 16c converts the accepted biometric information to data for matching (fingerprint feature-amount information), and performs a matching process on the converted data against the "fingerprint feature-amount information" for top 100 persons with high predicted values stored in the first storage-information memory 15e in the time slot (to 8:30) on Monday.

For example, if there is no biometric information that matches the accepted biometric information in the biometric information of the higher half of the biometric information stored in the first storage-information memory 15e, the matching unit 16c matches it against the biometric information of the lower half of the biometric information stored in the first storage-information memory 15e, and, at the same time, previously stores "biometric information for users in a further lower order" in the list created by the storing unit 16b, in the second storage-information memory 15f. Furthermore, if there is no biometric information that matches the accepted biometric information in the biometric information of the lower half of the biometric information stored in the first storage-information memory 15e, the matching unit 16c matches it against the biometric information of the higher half and against the lower half of the biometric information stored in the second storage-information memory 15f in the same manner. At this time, the matching unit 16c deletes the biometric information stored in the first storage-information memory 15e, and previously stores the "biometric information for users in a further lower order" in the first storage-information memory 15e if there is no biometric information that matches the accepted biometric information in the biometric information of the higher half of the biometric information stored in the second storage-information memory 15f. If there is no biometric information that matches the accepted biometric information in the biometric information of the lower half of the biometric information stored in the second storage-information memory 15f, this time the matching unit 16c performs the matching process against the biometric information previously stored in the first storage-information memory 15e. Here, the process is performed until the accepted biometric information is matched against all the biometric information registered in the biometric-information memory 15d.

More specifically, first, the first storage-information memory 15e is used as "memory for matching process" and the second storage-information memory 15f is used as "memory for preparation of matching process", and if there is no biometric information that matches the accepted biometric information in the biometric information stored in the first storage-information memory 15e, then the second storage-information memory 15f is used as the "memory for matching process", and the first storage-information memory 15e is used as the "memory for preparation of matching process". In this manner, their roles of these memories are alternately changed to each other to perform the matching process.

The authentication unit 16d determines whether the person having entered the accepted biometric information is authenticated as the user based on the result of matching in the matching unit 16c. That is, the authentication unit 16d determines that the user (user ID: 00001) having entered the accepted biometric information into the biometric information reader is authenticated as the user when there is biometric information that matches the accepted biometric information, and notifies the biometric information reader of the determination result that the user is authenticated through the communication control unit 13. Meanwhile, when there is no biometric information that matches the accepted biometric information, then the authentication unit 16d determines that the user is not authenticated, and notifies the biometric information reader of the determination result that the user is not authenticated through the communication control unit 13.

It should be noted that the present embodiment has explained the case in which two, the first storage-information memory 15e and the second storage-information memory 15f are installed as a predetermined memory that previously stores therein the biometric information, however, the present invention is not limited thereto. Thus, it is possible to arbitrarily change the number of installations of the predetermined memory that previously stores therein the biometric information.

Moreover, the present embodiment has explained the case in which all the components such as the biometric-information memory 15d, the first storage-information memory 15e, and the second storage-information memory 15f are arranged in the user authentication device 10, however, the present invention is not limited thereto. Thus, there may be a case in which, for example, the biometric-information memory 15d, the first storage-information memory 15e, and the second storage-information memory 15f are separately arranged in a different space such as a central control room and data transmission/reception is performed through a network.

Procedure of Processes Performed by User Authentication Device according to First Embodiment Next, processes performed by the user authentication device 10 according to the first embodiment are explained with reference to FIGS. 7 to 9. FIG. 7 is a diagram for explaining a predicted-value calculation process in the user authentication device according to the first embodiment, FIG. 8 is a diagram for explaining a biometric-information storage process in the user authentication device according to the first embodiment, and FIG. 9 is a diagram for explaining a process from acceptance of biometric information to authentication in the user authentication device according to the first embodiment.

Procedure of Predicted-Value Calculation Process in User Authentication Device according to First Embodiment As represented in FIG. 7, the user authentication device 10 according to the first embodiment accepts a predicted-value calculation request from a controller who performs the entry control into the first facility (YES at Step S701), the predicted-value calculator 16a calculates a predicted value as a use probability, for each user, that the user requests authentication to use the "first facility" (Step S702), and ends the process.

For example, when a request to calculate a predicted value for Monday is accepted from the controller who performs the entry control into the first facility, the predicted-value calculator 16a refers to the "attribute information setting" for "Monday" in the "first facility" stored in the attribute-information-setting memory 15b represented in FIG. 5, calculates a predicted value as a use probability for each user from the "user information" for "Monday" in the "first facility" stored in the user-information memory 15a represented in FIG. 4, and stores the result thereof in the calculation-result memory 15c (see FIG. 6). For example, as represented in FIG. 6, for the user with "user ID: 00003", the predicted-value calculator 16a calculates, as predicted values for "Monday" in the "first facility", "20%" for "time slot: to 8:00", "40%" for "time slot: to 8:30", "45%" for "time slot: to 9:00", "45%" for "time slot: to 9:30", "0%" for "time slot: to 10:00", and "5%" for "time slot: other".

Procedure of Biometric-Information Storage Process in User Authentication Device according to First Embodiment As represented in FIG. 8, in the user authentication device 10 according to the first embodiment, when the time slot designated by the controller who performs the entry control into the first facility comes (YES at Step S801), the storing unit 16b previously stores the biometric information for a plurality of users determined from the predicted values in the first storage-information memory 15e (Step S802), and ends the process.

For example, at "8:01" on Monday, the storing unit 16b refers to the calculation result stored in the calculation-result memory 15c represented in FIG. 6, creates a list of users rearranged in order from the one with a high predicted value in the "time slot: to 8:30", and further previously stores "fingerprint feature-amount information" for top 100 persons with high predicted values determined by referring to the list, from the biometric-information memory 15d represented in FIG. 3 to the first storage-information memory 15e.

Procedure of Process from Acceptance of Biometric Information to Authentication in User Authentication Device According to First Embodiment As represented in FIG. 9, the user authentication device 10 according to the first embodiment stores biometric information for matching in the "memory for matching process" (Step S901), and matches the data for matching of the stored matching information against the higher half with the high predicted values among the biometric information stored in the "memory for matching process" (Step S902).

For example, at "8:01" on Monday, the storing unit 16b previously stores "fingerprint feature-amount information" for top 100 persons with high predicted values determined by referring to the list of the users rearranged in order from the one with the high predicted value in the "time slot: to 8:30", from the biometric-information memory 15d to the first storage-information memory 15e being the "memory for matching process". The matching unit 16c matches data for matching (fingerprint feature-amount information), in which the biometric information accepted from the user (user ID: 00001) being the employee desiring to enter the "first facility" is converted and stored, against those for further top 50 persons (for 50 persons from first to 50-th persons) among the "fingerprint feature-amount information" for top 100 persons with high predicted values previously stored in the first storage-information memory 15e as the data for matching.

If there is matched biometric information (specifically, matched fingerprint feature-amount information) determined by the matching unit 16c (YES at Step S903), the authentication unit 16d determines that the person having entered the accepted biometric information is authenticated as the user, notifies the biometric information reader of the authentication (Step S906), and ends the process.

On the other hand, when there is no matched biometric information (specifically, no matched fingerprint feature-amount information) (NO at Step S903), the matching unit 16c matches the accepted biometric information against those for a remaining lower half (for remaining 50 persons from 51-th to 100-th persons) among the data for matching (fingerprint feature-amount information) for the biometric information previously stored in the first storage-information memory 15e (Step S904), and, at the same time, determines whether there is any data not stored in the second storage-information memory 15f being the "memory for preparation of matching process" among the data as objects for matching of the biometric information registered in the biometric-information memory 15d (Step S907).

Here, if there is any data not stored in the "memory for preparation of matching process" among the data as objects for matching of the biometric information registered in the biometric-information memory 15d (YES at Step S907), the matching unit 16c stores next data as an object for matching in the second storage-information memory 15f being the "memory for preparation of matching process" (Step S908). For example, the matching unit 16c stores data for matching (fingerprint feature-amount information) of the biometric information corresponding to further lower-order users (for example, from 101-th to 200-th), as next data as objects for matching, from the biometric-information memory 15*d* to the second storage-information memory 15*f*.

If there is matched biometric information (specifically, matched fingerprint feature-amount information) among the remaining lower half (for remaining 50 persons from 51-th to 100-th persons) determined by the matching unit 16*c* (YES at Step S905), the authentication unit 16*d* determines that the person having entered the accepted biometric information is authenticated as the user, notifies the biometric information reader of the authentication (Step S906), and ends the process.

On the other hand, if there is no matched biometric information (specifically, no matched fingerprint feature-amount information) among the remaining lower half (for remaining 50 persons from 51-th to 100-th persons) (NO at Step S905), the matching unit 16*c* uses the second storage-information memory 15*f* as the "memory for matching process" and the first storage-information memory 15*e* as the "memory for preparation of matching process", and, thereafter, performs the same process from Step S901. In this manner, the data for matching of the biometric information are alternately stored in the first storage-information memory 15*e* and in the second storage-information memory 15*f* until the accepted biometric information is matched against all the data for matching of the biometric information registered in the biometric-information memory 15*d*, and the matching process is performed.

If there is no data that is not stored in the "memory for preparation of matching process" among the data as objects for matching of the biometric information registered in the biometric-information memory 15*d* (NO at Step S907), the authentication unit 16*d* determines that the person having entered the accepted biometric information is not authenticated as the user, notifies the biometric information reader that the person is not authenticated (Step S906), and ends the process.

Effect of First Embodiment

As explained above, according to the first embodiment, the biometric information (for example, fingerprint feature-amount information as the data for matching) registered for each user is held, the user information being the "fixed information", the "total room-entry history", the "individual room-entry history", and the "position" which are the plurality types of attribute information associated with each user is held, a possibility that the user requests authentication is predicted to calculate a predicted value for each user by using the attribute information contained in the held user information, and when the biometric information for an authentication request is accepted, the accepted biometric information is matched against the biometric information stored in the biometric-information memory 15*d* about the plurality of users determined based on the calculated predicted values, to determine whether the person having entered the accepted biometric information is authenticated as the user based on the result of the matching. Therefore, each priority can be added to the registered biometric information based on the predicted value for each user calculated from the plurality types of attribute information, which allows achievement of the efficient authentication.

Moreover, according to the first embodiment, the attribute information used for calculating a predicted value for each user is set from the plurality types of attribute information, and the predicted value for each user is calculated from the set attribute information. Therefore, it is possible to set attribute information to be prioritized to calculate a predicted value for each user and add a high-accuracy priority to the biometric information, which allows achievement of the efficient authentication. As represented in FIG. 5, for example, it is possible to select the setting to give a high predicted value in all the time slots to the user with "user ID: 00002" indicating "position: board member", and it is further possible to select the setting, for the user with "user ID: 00003" whose working place is assigned to some other facility, in such a manner that the "total room-entry history" is adopted for up to "8:30" which is the working start time and the "individual room-entry history" is adopted for the time slots thereafter. Therefore, the setting can be arbitrarily selected according to a situation, which allows achievement of the efficient authentication. Moreover, the attribute information can be set so that, for example, "numerical value: 1" is given to a person who needs immediate authentication of the entry like one with "position: security guard" and high predicted values are calculated for all the time slots.

Furthermore, according to the first embodiment, because the use probability is calculated as one of predicted values, a possibility that the user requests authentication can be calculated for each user as a probability being a clear standard, which allows achievement of the efficient authentication.

Moreover, according to the first embodiment, the biometric information for a plurality of users determined based on the calculated predicted values is previously stored in the first storage-information memory 15*e* or in the second storage-information memory 15*f*, and the accepted biometric information and the biometric information stored in the first storage-information memory 15*e* or in the second storage-information memory 15*f* are matched against each other, so that the calculation time for the result of authentication can be reduced, which allows achievement of more efficient authentication.

[b] Second Embodiment

Although the first embodiment has explained the case in which the biometric information is previously stored in the predetermined memory, the second embodiment will explain a case in which the biometric information previously stored in the predetermined memory is deleted according to the situation.

Overview and Characteristics of User Authentication Device according to Second Embodiment First, the main characteristics of the user authentication device according to the second embodiment are specifically explained with reference to FIG. 10. FIG. 10 is diagrams for explaining the overview and characteristics of the user authentication device according to the second embodiment.

The user authentication device according to the second embodiment monitors its own device that includes the first storage-information memory 15*e* and the second storage-information memory 15*f* for storing therein the biometric information for a plurality of users stored by the storing unit 16*b*, and detects unauthorized access to the first storage-information memory 15*e* and the second storage-information memory 15*f*. The "unauthorized access" indicates electrical or physical unauthorized act for the purpose to steal registered information. For example, the present embodiment assumes cracking to the user authentication device itself as the unauthorized access, and, as represented in (A) of FIG. 10, the user authentication device according to the second embodiment monitors communication situations with the biometric information reader, and determines, when the communication with the biometric information reader is possible, that no unauthorized access is made to the own device that includes the first storage-information memory 15*e* and the second storage-information memory 15*f*.

If the unauthorized access to the first storage-information memory 15e and the second storage-information memory 15f is detected, the user authentication device according to the second embodiment deletes the biometric information stored in the first storage-information memory 15e and in the second storage-information memory 15f. For example, as represented in (B) of FIG. 10, the user authentication device according to the second embodiment monitors communication situations with the biometric information reader, detects unauthorized access when a communication failure occurs between the own device and the biometric information reader, and deletes the biometric information stored in the first storage-information memory 15e and in the second storage-information memory 15f. It should be noted that the biometric-information memory 15d may be set so as to delete the registered biometric information in case of the cracking.

Because of this, the user authentication device according to the second embodiment can suppress the damage due to leakage of personal information to a minimum, which allows achievement of efficient and high-security authentication.

Configuration of User Authentication Device According to Second Embodiment

Figure 11:
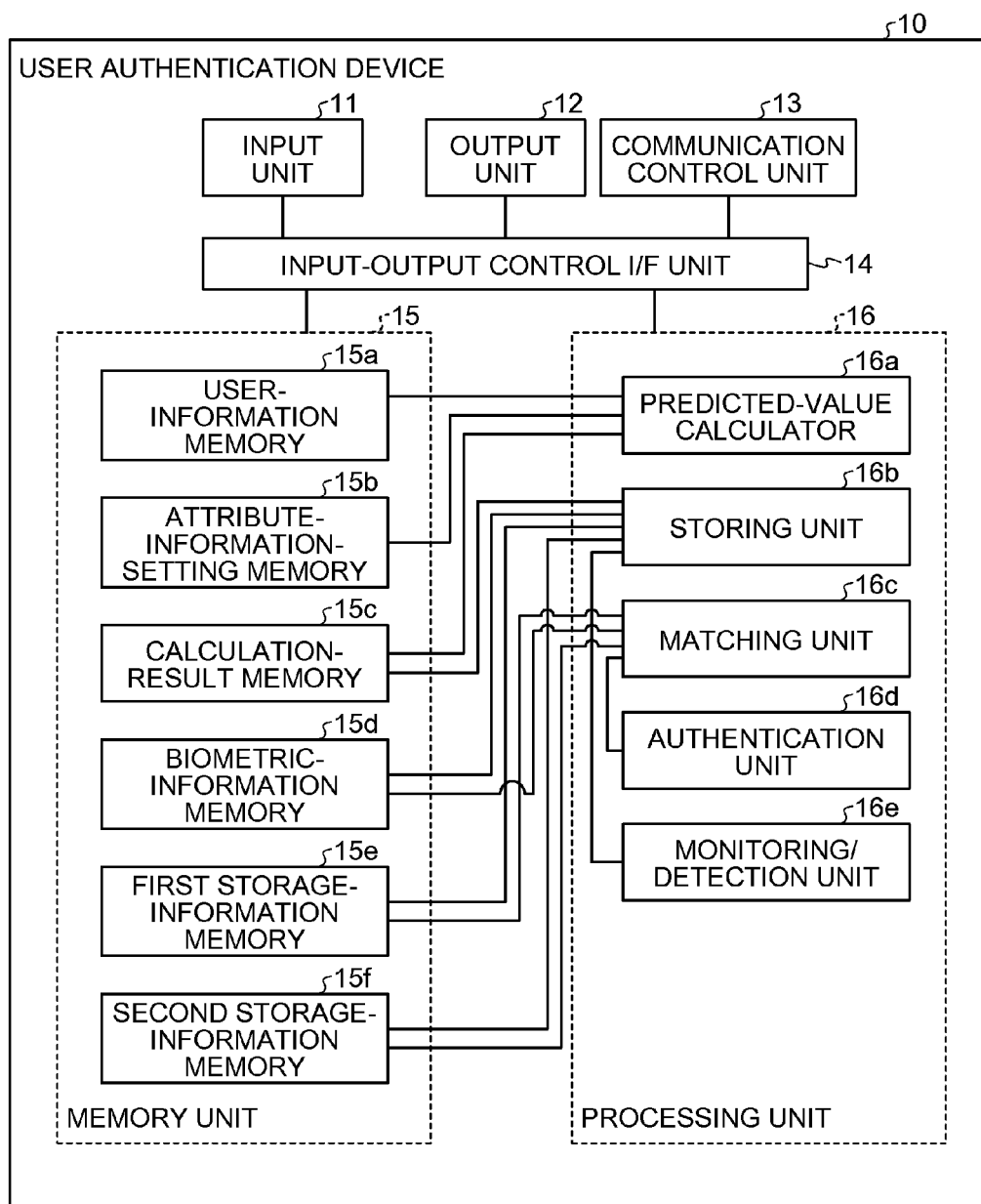
FIG. 11 is a block diagram representing a configuration of the user authentication device according to the second embodiment.

Next, the user authentication device according to the second embodiment is explained with reference to FIG. 11. FIG. 11 is a block diagram representing a configuration of the user authentication device according to the second embodiment.

The user authentication device 10 according to the second embodiment is basically the same as the user authentication device 10 according to the first embodiment represented in FIG. 2, but is different in a point that a monitoring/detection unit 16e is newly provided. This point is mainly explained below. The monitoring/detection unit 16e corresponds to a "monitoring/detection unit" according to what is claimed.

The monitoring/detection unit 16e monitors the first storage-information memory 15e and the second storage-information memory 15f, and also the user authentication device 10 including these memories, and detects unauthorized access to the first storage-information memory 15e and the second storage-information memory 15f. For example, as represented in (A) of FIG. 10, the monitoring/detection unit 16e monitors communication situations with the biometric information reader through the communication control unit 13, and determines, when the communication with the biometric information reader is possible, that no unauthorized access is made to the user authentication device 10 including the first storage-information memory 15e and the second storage-information memory 15f.

When the monitoring/detection unit 16e detects unauthorized access to the first storage-information memory 15e and the second storage-information memory 15f, the storing unit 16b deletes the biometric information stored in the first storage-information memory 15e and in the second storage-information memory 15f. For example, as represented in (B) of FIG. 10, the storing unit 16b monitors communication situations with the biometric information reader, detects unauthorized access when a communication failure occurs between the own device and the biometric information reader, and deletes the biometric information stored in the first storage-information memory 15e and in the second storage-information memory 15f.

Figure 12:
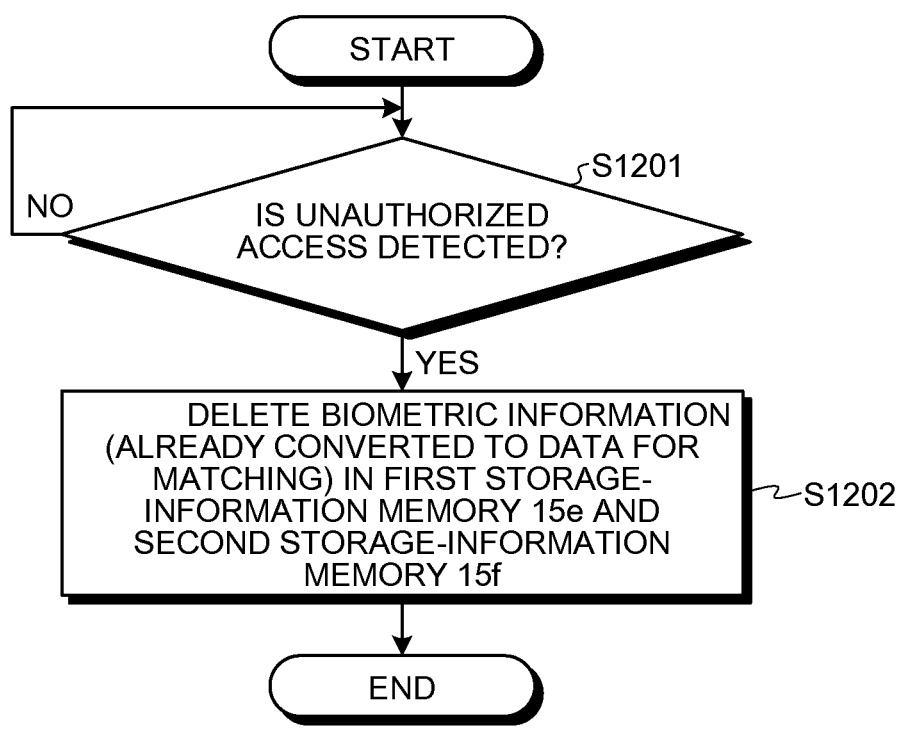
FIG. 12 is a diagram for explaining a process of the user authentication device according to the second embodiment.

Procedure of Process Performed by User Authentication Device According to Second Embodiment Next, a process performed by the user authentication device 10 according to the second embodiment is explained with reference to FIG. 12. FIG. 12 is a diagram for explaining the process in the user authentication device according to the second embodiment.

Procedure of Process in User Authentication Device according to Second Embodiment First, in the user authentication device 10 according to the second embodiment, when the monitoring/detection unit 16e detects unauthorized access to the first storage-information memory 15e and the second storage-information memory 15f (YES at Step S1201), the storing unit 16b deletes the biometric information stored in the first storage-information memory 15e and in the second storage-information memory 15f (Step S1202), and ends the process.

For example, as represented in (A) of FIG. 10, the monitoring/detection unit 16e monitors communication situations with the biometric information reader through the communication control unit 13, and determines, when a communication failure occurs between the own device and the biometric information reader, that unauthorized access is detected, and the storing unit 16b deletes the biometric information stored in the first storage-information memory 15e and in the second storage-information memory 15f.

Effect of Second Embodiment

As explained above, according to the second embodiment, the own device that includes the first storage-information memory 15e and the second storage-information memory 15f for storing therein the biometric information for a plurality of users stored by the storing unit 16b is monitored, unauthorized access to these memories is detected, and when the unauthorized access is detected, the biometric information stored in these memories is deleted. Therefore, the damage due to leakage of personal information can be suppressed to a minimum, which allows achievement of efficient and high-security authentication.

Incidentally, the first and the second embodiments have explained the case in which the various processes are implemented by hardware logic, however, the present invention is not limited thereto, and thus, a previously prepared program may be executed by the computer. The following will therefore explain one example of the computer for executing a user authentication program having the same function as that of the user authentication device 10 as represented in the first embodiment, with reference to FIG. 13. FIG. 13 is a diagram representing a computer executing a user authentication program according to the first embodiment.

As represented in FIG. 13, a computer 130 being an information processing unit includes a keyboard 131, a display 132, a CPU 133, a ROM 134, a HDD 135, a RAM 136, and the communication control unit 13, which are connected to each other through a bus 137 or the like.

Previously stored in the ROM 134 are user authentication programs having functions the same as these in the user authentication device 10 represented in the first embodiment, i.e., as represented in FIG. 13, a predicted-value calculation program 134a, a storage program 134b, a matching program 134c, and an authentication program 134d. These programs 134a to 134d may be integrated or separated as necessary in the same manner as that of the components in the user authentication device 10 represented in FIG. 2.

The CPU 133 reads these programs 134a to 134d from the ROM 134 and executes them, and, as represented in FIG. 13, these programs 134a to 134d thereby come to function as a predicted-value calculation process 133a, a storage process 133b, a matching process 133c, and an authentication process 133d, respectively. These processes 133a to 133d correspond to the predicted-value calculator 16a, the storing unit 16b, the matching unit 16c, and the authentication unit 16d, respectively, as represented in FIG. 2.

Furthermore, as represented in FIG. 13, the HDD 135 includes user-information data 135a, attribute-informationsetting data 135b, calculation-result data 135c, biometric-information data 135d, first storage-information data 135e, and second storage-information data 135f. The user-information data 135a corresponds to the user-information memory 15a used in FIG. 2, the attribute-information-setting data 135b corresponds to the attribute-information-setting memory 15b, the calculation-result data 135c corresponds to the calculation-result memory 15c, the biometric-information data 135d corresponds to the biometric-information memory 15d, the first storage-information data 135e corresponds to the first storage-information memory 15e, and the second storage-information data 135f corresponds to the second storage-information memory 15f. The CPU 133 registers user-information data 136a in the user-information data 135a, registers attribute-information-setting data 136b in the attribute-information-setting data 135b, registers calculation-result data 136c in the calculation-result data 135c, registers biometric-information data 136d in the biometric-information data 135d, registers first storage-information data 136e in the first storage-information data 135e, and registers second storage-information data 136f in the second storage-information data 135f. The CPU 133 then reads the user-information data 136a, the attribute-information-setting data 136b, the calculation-result data 136c, the biometric-information data 136d, the first storage-information data 136e, and the second storage-information data 136f, to be stored in the RAM 136, and executes the user authentication process based on the user-information data 136a, the attribute-information-setting data 136b, the calculation-result data 136c, the biometric-information data 136d, the first storage-information data 136e, and the second storage-information data 136f stored in the RAM 136.

The programs 134a to 134d are not necessarily stored in the ROM 134 from the beginning, thus, the programs are stored in a "transportable physical medium" such as flexible disk (FD), CD-ROM, MO disc, DVD disc, magneto-optical disc, and IC card each of which is inserted into the computer 130, or in a "fixed physical medium" such as a HDD internally or externally provided in the computer 130, and the programs is further stored in "other computer (server)" connected to the computer 130 through a public line, the Internet, LAN, and WAN or the like, and the computer 130 may read the programs from these to execute them.

Among the processes explained in the embodiments, the whole or part of the processes explained as these being automatically performed can also be manually performed (for example, a predicted-value calculation request is accepted not from the controller but the predicted-value calculation request is automatically created for each fixed period), or the whole or part of the processes explained as these being manually performed can also be automatically performed using a known method. As other than these, for example, the procedures represented in the text and the drawings, the specific names, and the information containing various data and parameters (for example, the biometric information stored in the first storage-information memory 15e and in the second storage-information memory 15f) can be arbitrarily updated unless otherwise specified.

Moreover, the components of the units represented in the figures are functionally conceptual, which does not necessarily require the configuration as physically represented one. That is, specific configurations of separation and integration of the processing units and the memories (for example, the configuration in FIG. 2) are not limited to these represented in the figures. Therefore, for example, the whole or part of the components can be configured by being functionally or physically separated or integrated in arbitrary units according to various loads and use situations or the like, such as integration of the matching unit 16c and the authentication unit 16d. Furthermore, the whole or an arbitrary part of the functions for the processes performed in the units can be implemented by the CPU and the programs analyzed and executed by the CPU, or can be implemented as hardware based on wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A user authentication device comprising:
   a first holding unit that holds a plurality of pieces of biometric information, each of the plurality of pieces of the biometric information corresponding to each of a plurality of users;
   a second holding unit that holds a plurality types of attribute information;
   an accepting unit that accepts biometric information;
   a first calculating unit that, for the same user, calculates a plurality of different use probabilities of user authentication by using the plurality types of attribute information held by the second holding unit;
   a second calculating unit that calculates a matching probability that the accepted biometric information matches the plurality of pieces of biometric information held by the first holding unit;
   a setting unit that resets the plurality types of attribute information used for calculating the plurality of different use probability when the matching probability calculated by the second calculating unit is less than a predetermined value; and
   a matching unit that, based on each use probability calculated by the first calculating unit, matches the accepted biometric information against each of the plurality of pieces of the biometric information held by the first holding unit,
   wherein the setting unit excludes the biometric information for the user of which use efficiency calculated by the second calculating unit is less than the predetermined value, from objects to be matched by the matching unit.

2. The user authentication device according to claim 1, wherein the attribute information contains attribute information due to at least any one of user history information, building use information, use time-slot information, and user position information.

3. The user authentication device according to claim 1, further comprising:
   a storing unit that previously stores biometric information for a plurality of users determined based on the use probabilities calculated by the first calculating unit in a predetermined memory, wherein
   the matching unit matches the accepted biometric information against the biometric information stored in the predetermined memory by the storing unit.

4. The user authentication device according to claim 3, wherein the matching unit instructs the storing unit to read biometric information, as a next candidate for matching, not stored in the predetermined memory by the storing unit in another memory different from the predetermined memory even before the matching of the accepted biometric information against all the biometric information stored in the predetermined memory by the storing unit is completely finished.

5. The user authentication device according to claim 4, wherein
the setting unit dynamically changes setting of the attribute information used for calculating the use probability, and
the storing unit updates the biometric information stored in the predetermined memory by using a use probability changed and calculated by the first calculating unit based on dynamically changed setting of the attribute information.

6. The user authentication device according to claim 3, further comprising:
a monitoring/detection unit that monitors the predetermined memory for storing therein biometric information stored by the storing unit and also monitors a device including the predetermined memory, and detects unauthorized access to the predetermined memory, wherein
the storing unit deletes the biometric information stored in the predetermined memory when unauthorized access to the predetermined memory is detected by the monitoring/detection unit.

7. A user authentication method comprising:
using a memory, holding a plurality of pieces of biometric information, each of the plurality of pieces of the biometric information corresponding to each of a plurality of users;
using the memory, holding a plurality types of attribute information;
using a processor, accepting biometric information;
using the processor, calculating, for the same user, a plurality of different use probabilities of user authentication by using the plurality types of attribute information;
using the processor, calculating a matching probability that the accepted biometric information matches the plurality of pieces of biometric information;
using the processor, resetting the plurality types of attribute information used for calculating the plurality of different use probability when the matching probability is less than a predetermined value; and
using the processor, matching, based on each use probability calculated by the calculating, the accepted biometric information against each of the plurality of pieces of the biometric information,
wherein, in the resetting, excluding the biometric information for the user of which the calculated use efficiency is less than the predetermined value, from objects to be matched in the matching.

8. A non-transitory computer readable storage medium having stored therein a user authentication program for causing a computer to perform a user authentication method, the user authentication program causing the computer to execute a process comprising:
holding a plurality of pieces of biometric information, each of the plurality of pieces of the biometric information corresponding to each of a plurality of users;
holding a plurality types of attribute information;
accepting biometric information;
calculating, for the same user, a plurality of different use probabilities of user authentication by using the plurality types of attribute information;
calculating a matching probability that the accepted biometric information matches the plurality of pieces of biometric information;
resetting the plurality types of attribute information used for calculating the plurality of different use probability when the matching probability is less than a predetermined value; and
matching, based on each use probability calculated by the calculating, the accepted biometric information against each of the plurality of pieces of the biometric information
wherein, in the resetting, excluding the biometric information for the user of which the calculated use efficiency is less than the predetermined value, from objects to be matched in the matching.

* * * * *